(12) United States Patent
Fardig et al.

(10) Patent No.: US 11,853,525 B1
(45) Date of Patent: Dec. 26, 2023

(54) SYSTEMS AND METHODS FOR PRESENTING CONTENT AREAS ON AN ELECTRONIC DISPLAY

(71) Applicant: LENOVO (SINGAPORE) PTE. LTD, NEW TECH PARK (SG)

(72) Inventors: Matthew Fardig, Boonville, IN (US); Inna Zolin, Cary, NC (US); Lindsay Nelson, Highlands Ranch, CO (US); Allen Richey, Frisco, TX (US)

(73) Assignee: LENOVO (SINGAPORE) PTE. LTD, New Tech Park (SG)

( * ) Notice: Subject to any disclaimer, the term of this patent is extended or adjusted under 35 U.S.C. 154(b) by 0 days.

(21) Appl. No.: 17/751,779

(22) Filed: May 24, 2022

(51) Int. Cl.
*G06F 3/0481* (2022.01)

(52) U.S. Cl.
CPC .. *G06F 3/0481* (2013.01); *G06F 2203/04803* (2013.01)

(58) Field of Classification Search
CPC ............... G06F 3/0481; G06F 2203/04803
See application file for complete search history.

(56) References Cited

U.S. PATENT DOCUMENTS

| | | | | |
|---|---|---|---|---|
| 4,769,636 | A * | 9/1988 | Iwami | G09G 5/14 715/790 |
| 11,112,959 | B2 * | 9/2021 | Louch | G06F 3/0488 |
| 2013/0120295 | A1 * | 5/2013 | Kim | G06F 3/0486 345/173 |
| 2016/0034155 | A1 * | 2/2016 | Vranjes | G06F 3/04842 715/803 |
| 2019/0107925 | A1 * | 4/2019 | Cunico | G06F 3/0481 |
| 2022/0130304 | A1 * | 4/2022 | Chung | G06F 1/1652 |
| 2022/0147156 | A1 * | 5/2022 | Hyun | G06F 3/0481 |

\* cited by examiner

*Primary Examiner* — Mong-Shune Chung
(74) *Attorney, Agent, or Firm* — THE SMALL PATENT LAW GROUP LLC; Dean D. Small (57) ABSTRACT

A system and a method include a display configured to show a first content area and a second content area. A control unit is in communication with the display. The control unit is configured to separate the second content area into a plurality of components in response to the first content area obscuring at least a portion of the second content area, and show at least one of the plurality of the components on a portion of the display that is outside of the first content area.

17 Claims, 4 Drawing Sheets

SYSTEMS AND METHODS FOR PRESENTING CONTENT AREAS ON AN ELECTRONIC DISPLAY

BACKGROUND

Embodiments of the present disclosure generally relate to systems and methods for presenting (such as showing, displaying, or the like) content areas for various applications on an electronic display.

Computer systems including monitors can be used to operate various applications, such as word processing, video games, slide show presentations, email, internet, calendars, audio and/or video livestreams, audio and/or video recordings, and/or the like. Certain programs show each application in a defined content area, such as a window.

Window management programs typically involve a grid system. A single application can be shown on a single piece of the grid. As such, if a large window is using part of the screen, other applications are forced to be constrained in smaller remaining portions, thereby leading to wasted screen space, and/or graphics, text, or the like that can be difficult to discern by an individual.

Certain grid-based implementations rely on a pre-definition of a grid layout. Others provide hotkeys or other methods to move certain windows to other areas of a screen. However, such systems are unaware of reduced space on the screen, and typically rely on scrollbars to allow for engagement with reduced-sized windows, thereby making use of certain applications difficult.

SUMMARY

A need exists for a system and a method for improving presentation of content areas on a display of device, such as a computer. Further, a need exists for a system and a method for providing content areas with increased discernibility and ease of interaction on a screen of a device.

With those needs in mind, certain examples of the present disclosure provide a system including a display configured to show a first content area and a second content area. A control unit is in communication with the display. The control unit is configured to separate the second content area into a plurality of components in response to the first content area obscuring at least a portion of the second content area, and show at least one of the plurality of the components on a portion of the display that is outside of the first content area.

In at least one example, the first content area is an active content area in a foreground of the display, and the second content area is a background content area in a background of the display.

In at least one example, the plurality of components includes one or more prioritized content areas and one or more unprioritized content areas.

In at least one example, the control unit is configured to show both of the one or more prioritized content areas and the one or more unprioritized content areas on the portion of the display that is outside of the first content area. In at least one other example, the control unit is configured to show only the one or more prioritized content areas on the portion of the display that is outside of the first content area.

The system can also include a user interface in communication with the control unit and the display. The user interface is configured to allow an individual to interact with the first content area and the second content area. In at least one example, a device includes the display, the control unit, and the user interface.

In at least one example, the first content area relates to a first application, and the second content area relates to a second application. Each of the first application and the second application can include one of word processing, a video game, a slide show presentation, email, internet, a calendar, an audio and/or video livestream, or an audio and/or video recording, or the like.

Certain examples of the present disclosure provide a method including showing, on a display, a first content area and a second content area; separating, by a control unit in communication with the display, the second content area into a plurality of components in response to the first content area obscuring at least a portion of the second content area; and showing, by the control unit, at least one of the plurality of the components on a portion of the display that is outside of the first content area.

Certain examples of the present disclosure provide a non-transitory computer-readable storage medium comprising executable instructions that, in response to execution, cause one or more control units comprising a processor, to perform operations including showing a first content area and a second content area; separating the second content area into a plurality of components in response to the first content area obscuring at least a portion of the second content area; and showing at least one of the plurality of the components on a portion of the display that is outside of the first content area.

DETAILED DESCRIPTION

It will be readily understood that the components of the embodiments as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, appearances of the phrases "in one embodiment," "in an embodiment" or the like in various places throughout this specification are not necessarily all referring to the same embodiment.

Furthermore, the described features, structures or characteristics may be combined in any suitable manner in one or more embodiments. In the following description, numerous specific details are provided to give a thorough understanding of the various embodiments. One skilled in the relevant art will recognize, however, that the various embodiments can be practiced without one or more of the specific details, or with other methods, components, materials, etc. In other instances, well-known structures, materials, or operations are not shown or described in detail to avoid obfuscation. The following description is intended only by way of example, and simply illustrates certain example embodiments.

Figure 1:
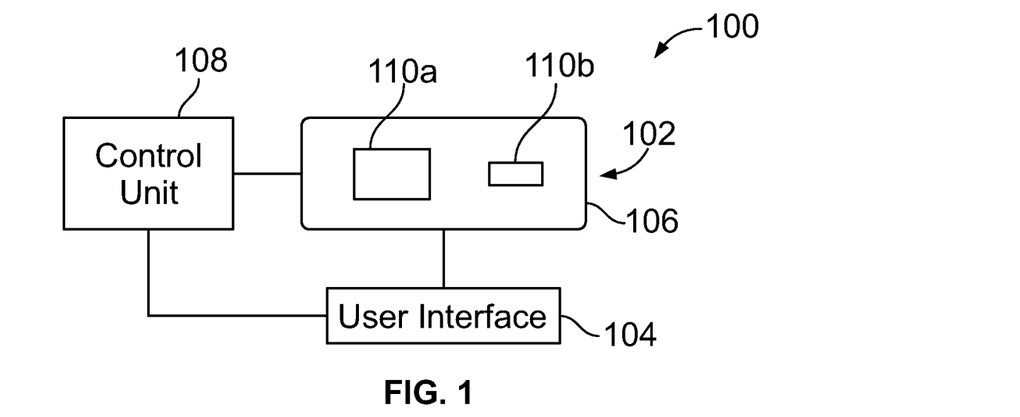
FIG. 1 illustrates a schematic block diagram of a system for presenting applications on a device, according to an example of the present disclosure.

FIG. 1 illustrates a schematic block diagram of a system 100 for presenting applications on a device 102, according to an example of the present disclosure. Examples of the device 102 include a personal or laptop computer, a specialized computer workstation, a handheld electronic device, such as a smart phone or a smart tablet, and/or the like. The device 102 includes a user interface 104 in communication with a display 106, such as through one or more wired or wireless connections. The display 106 is or otherwise includes an electronic screen. For example, the display 106 can be a monitor, a television, a touchscreen, and/or the like.

The user interface 104 includes one or components configured to interact with one or more applications, which are shown on the display 106. For example, the user interface 104 can include one or more of a keyboard, a mouse, a stylus, a touchscreen interface (use in conjunction with the display 106), and/or the like.

A control unit 108 can be in communication with the display 106 and the user interface 104, such as through one or more wired or wireless connections. In at least one example, the device 102 includes the control unit 108. For example, the device 102 can be contained within a housing of the device 102. As another example, the device 102 can be separate, distinct, and remote from the device 102.

The user interface 104, being in communication with the control unit 106 and the display 106, is configured to allow an individual to interact with content areas that are shown on the display 106. For example, the user interface 104 can be operated to move the content areas on the display 106, designate a content area as an active content area, resize and reshape the content areas, and the like.

The control unit 108 is configured to present (for example, show) one or more content areas, such as the first content area 110a and the second content area 110b, on the display 106. The control unit 108 can present more or less contents areas 110a and 110b than shown. For example, the control unit 108 can show a single content area 110a or 110b on the display 106. As another example, the control unit 108 can show three or more content areas on the display 106.

Each content area 110a or 110b relates to a particular application, such as word processing, a video game, a slide show presentation, email, internet, a calendar, an audio and/or video livestream, an audio and/or video recording, and/or the like. That is, a content area 110a or 110b shows information regarding a particular application. The applications shown on the content areas 110a or 110b can differ, or be of the same type. The content areas 110a and 110b can be graphical windows, bubbles or other such shapes, grids, and/or the like. A user interacts with the user interface 104 to move the content areas 110a and 110b on the display 106. Each content area 110a and 110b can be moved in relation to the display 106 through the user interface 104. Further, the user interface 104 can be used to selectively change the size and/or shape of each content area 110a and 110b.

As shown in FIG. 1, the content areas 110a and 110b do not obscure one another. For example, no portion of the content area 110a covers any portion of the content area 110b, or vice versa.

The user interface 104 is used to interact with the content areas 110a and 110b, as desired. As an example, when a user engages the content area 110a with the user interface 104 to access content (for example, view, manipulate data, or the like), the content area 110a is the active content area in the foreground of the display 106, while the content area 110b is the background content area in the background of the display 106. Conversely, when the user engages the content area 110b with the user interface 105 to access content, the content area 110b is the active content area in the foreground of the display 106, while the content area 110a is the background content area in the background of the display 106. The control unit 108 operates in conjunction with the user interface 104 and the display 106 to provide the active content area and the background content area. When the content areas 110a and 110b do not obscure one another, the control unit 108 allows both the content areas 110a and 110b to be unaffected and shown on the display 106, as shown in FIG. 1.

Figure 2:
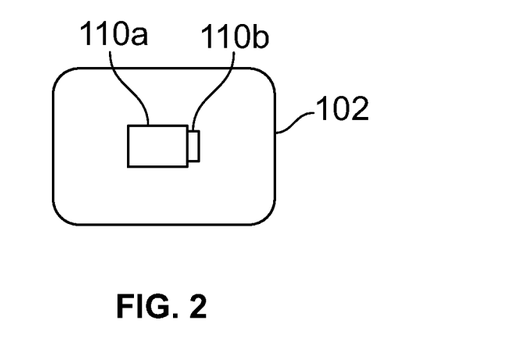
FIG. 2 illustrates a front view of a display showing a first content area obscuring a portion of a second content area, according to an example of the present disclosure.

FIG. 2 illustrates a front view of the display 106 showing a first content area 110a obscuring a portion of a second content area 110b, according to an example of the present disclosure. Referring to FIGS. 1 and 2, the user operates the user interface 104 to move the first content area 110a over at least a portion of the second content area 110b, thereby obscuring the portion of the second content area 110b.

In response to the first content area 110a obscuring the portion of the content area 110b, the control unit 108 determines if the portion of the second content area 110b is a prioritized portion of the second content area 110b. The prioritized portion can be predetermined. For example, a particular application can identify the prioritized portion, which can be an area that is determined to be viewable even if the content area is in in the background (that is, not the active area). As another example, the prioritized portion can be determined based on analysis of the particular areas within the content area. For example, a bounded area, a text area, a graphic area, or the like can be detected by the control unit 108, and determined to be the prioritized area. As another example, the prioritized area can be determined through crowd sourcing, artificial intelligence based on use over time, and/or the like. Each content area can include one or more prioritized areas.

If the control unit 108 determines that one or more prioritized areas of background content area (in the example of FIG. 2, the second content area 110b) are obscured (for example, covered, distorted, or the like) by the active content area (in the example of FIG. 2, the first content area 110a), the control unit 108 separates the background content area into a plurality of components (that is, separate and distinct portions or parts). For example, the control unit 108 can separate the background content area into one or more prioritized parts, which include the one or more prioritized areas, and one or more unprioritized parts, which include areas that are not prioritized areas. The control unit 108 then moves the prioritized areas to locations on the display 106 that are visible, and not obscured by the active content area. The areas on the display 106 can be predetermined, or predefined, such as by the user, for example, or automatically by the control unit 108.

In at least one example, the control unit 108 can separate the background content area into components, even if prioritized areas are not obscured. In this example, the background content area can be separated into components, which are separated from one another, and shown on different areas of the display 106, such that they are not obscured by any portion of the active content area.

In at least one example, if the active content area 110a does not obscure any prioritized area of the background content area, the control unit 108 may refrain from separating the background content area into components. In this example, the control unit 108 may separate the background content area into components, such as a prioritized content area and an unprioritized content area, in response to at least a portion of the prioritized content area being obscured by the active content area. The separated component, such as the prioritized content area, may be shown on a portion of the display 106 that is not obscured by the active content area, while the unprioritized content area can remain obscured by the active content area, or optionally shown on another area of the display 106 that is not obscured by the active content area. In at least one example, the control unit 108 sizes and shapes the components of the background content area, such as can be predetermined and/or determined through machine learning, artificial intelligence, and/or the like.

Figure 3:
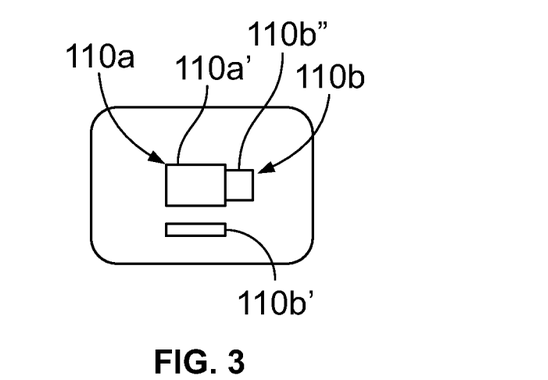
FIG. 3 illustrates a front view of the display showing an active content area and a background content area separated into components, according to an example of the present disclosure.

FIG. 3 illustrates a front view of the display 106 showing an active content area 110a' and a background content area 110b separated into components 110b' and 110b", according to an example of the present disclosure. Referring to FIGS. 1-3, the control unit 108 separated the background content area 110b into the first component 110b' and the second component 110b". In at least one example, the first component 110b' includes the prioritized content area of the background content area 110b, and is separated from the second component 110b", which may be or otherwise include the unprioritized content area. The first component 110b' including the prioritized content area is separated from both the active content area 110a' and the second component 110b" so as to be unobstructed by the active content area 110a' and the second component 110b".

The control unit 108 can separate the background content area 110b into more than two components, which can be shown on different areas of the display 106. For example, the control unit 108 can separate the background area 110b into three more components, which can be shown unobstructed by the active content area 110a on different areas of the display 106. The components are separated from one another, in that they may not directly contact one another, or may otherwise be shown in full, whether or not having one or more portions that abut against each other.

In at least one example, the first component 110b' may not include prioritized content. For example, the control unit 108 can separate the background content area 110b into separate components and show one or both unobstructed by the active content area 110a, whether or not the components include prioritized content.

When a user operates the user interface 104 to engage the second content area 110b to become the active content area, and the first content area 110a to be the background content area, the process repeats. In such an example, the control unit 108 separates the first content area 110a into components, when one or more portion of the first content area 110a are obscured by the second content area 110b, which has become the active content area.

As described herein, the system 100 includes the display 106, which is configured to show the first content area 110a and the second content area 110b. The control unit 108 is in communication with the display 106. The control unit 108 is configured to separate the second content area 110b into a plurality of components in response to the first content area 110a obscuring at least a portion of the second content area 110b. The control unit 108 is further configured to show at least one of the plurality of components on a portion of the display 106 that is outside of (for example, not covered or otherwise obscured by) the first content area 110a.

In at least one example, the first content area 110a is an active content area in a foreground of the display 106, and the second content area 110b is a background content area in a background of the display 106. In at least one example, the plurality of components includes one or more prioritized content areas and one or more unprioritized content areas. In at least one example, the control unit is configured to show both of the one or more prioritized content areas and the one or more unprioritized content areas on the portion of the display 106 that is outside of the first content area 110b. In at least one other example, the control unit 108 is configured to show only the one or more prioritized content areas on the portion of the display 106 that is outside of the first content area 110a.

The terms first and second in relation to the content areas are merely to identify a number of content areas. It is to be understood that the first content area can be the second content area, and vice versa.

Figure 4:
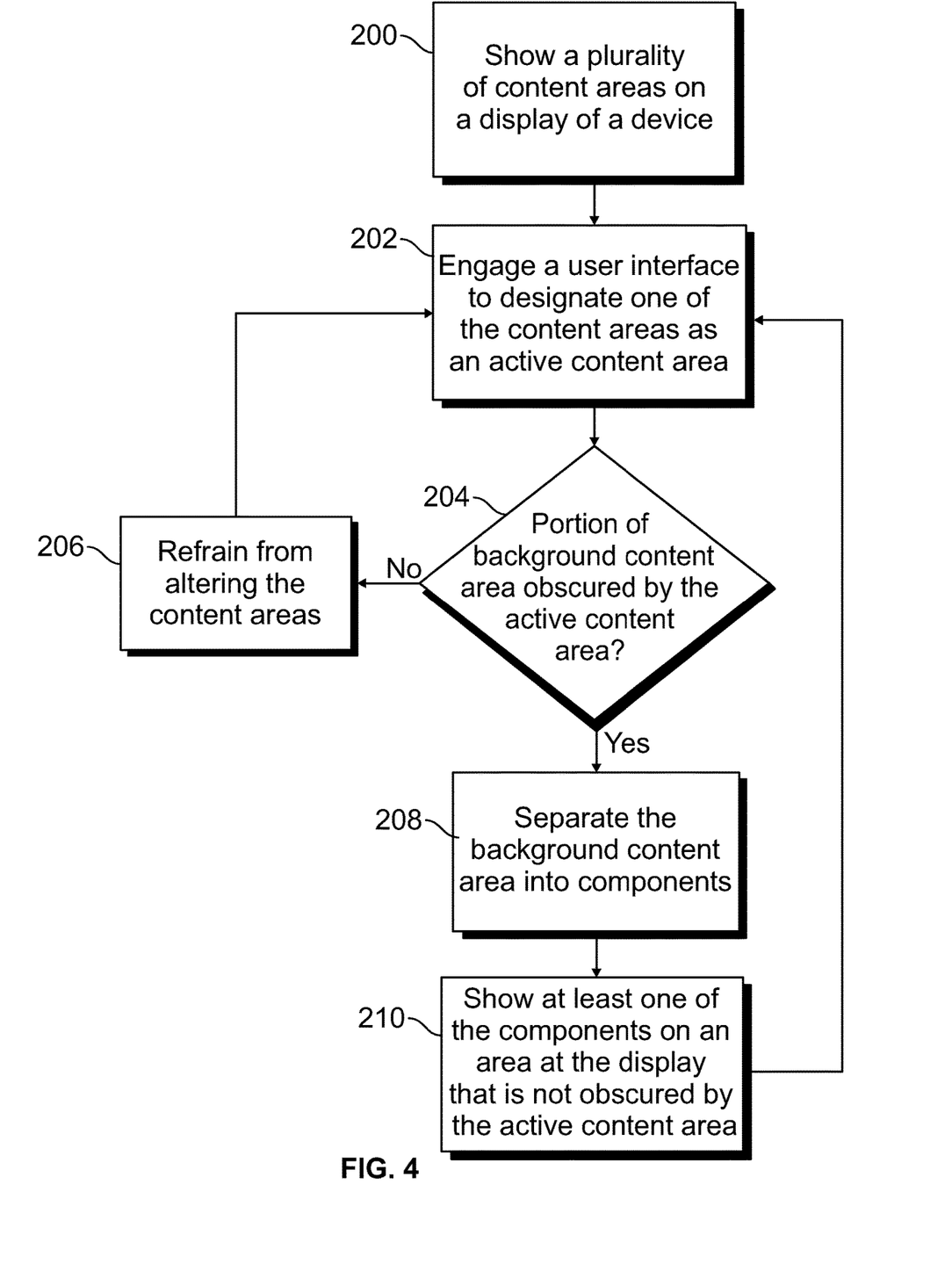
FIG. 4 illustrates a flow chart of a method for presenting applications on a device, according to an example of the present disclosure.

FIG. 4 illustrates a flow chart of a method for presenting applications on a device, according to an example of the present disclosure. Referring to FIGS. 1-4, at 200, the control unit 108 shows a plurality of content areas (such as the content areas 110a and 110b) on the display 106 of the device 102. At 202, a user engages the user interface 104 to designate one of the content areas as an active content area (and consequently the other content areas as background content area(s)). At 204, the control unit 108 determines if a portion of a background content area is obscured by the active content area. If not, the method proceeds from 204 to 206, at which the control unit 108 refrains from altering the content areas. The method then returns to 202.

If, however, a portion of the background area is obscured by the active content area at 204, the method proceeds to 208, at which the control unit 108 separates the background content area into multiple components. At 210, the control unit then shows at least one of the components on an area of the display that is not obscured by the active content area. The method then returns to 202.

The control unit 108, by separating the background content area into components, provides a specialized processing system that improves operation of the device 102. In particular, the control unit 108 separates the background content area into components that are readily and easily discernable and viewable on the display 106 in response to the active content area obscuring one or more portions of the background content area.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 108 may be or include one or more processors that are configured to control operation, as described herein.

The control unit 108 is configured to execute a set of instructions that are stored in one or more data storage units or elements (such as one or more memories), in order to process data. For example, the control unit 108 may include or be coupled to one or more memories. The data storage units may also store data or other information as desired or needed. The data storage units may be in the form of an information source or a physical memory element within a processing machine.

The set of instructions may include various commands that instruct the control unit 108 as a processing machine to perform specific operations such as the methods and processes of the various embodiments of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units, such as the control unit 108. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 108 may represent processing circuitry such as one or more of a field programmable gate array (FPGA), application specific integrated circuit (ASIC), microprocessor(s), and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

In at least one example, all or part of the systems and methods described herein may be or otherwise include an artificial intelligence (AI) or machine-learning system that can automatically perform the operations of the methods also described herein. For example, the control unit 108 can be an artificial intelligence or machine learning system. These types of systems may be trained from outside information and/or self-trained to repeatedly improve information shown on the display. The control unit 108 can determine the prioritized areas, locations for display of components of the background content area, and the like via artificial intelligence and/or machine learning. Over time, these systems can improve by matching records with increasing accuracy and speed, thereby significantly reducing the likelihood of any potential errors. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), or the like. The systems may be trained and re-trained using feedback from one or more prior analyses of samples and/or data. Based on this feedback, the systems may be trained by adjusting one or more parameters, weights, rules, criteria, or the like, used in the analysis of the same or other samples. This process can be performed using generated data instead of training data, and may be repeated many times to repeatedly improve the correlation of commands. The training of the record matching system minimizes false positives and/or false negatives by performing an iterative training algorithm, in which the systems are retrained with an updated set of data and based on the feedback examined prior to the most recent training of the systems. This provides a robust analysis model that can better determine prioritized content areas, areas on the display for showing components, and the like.

Figure 5:
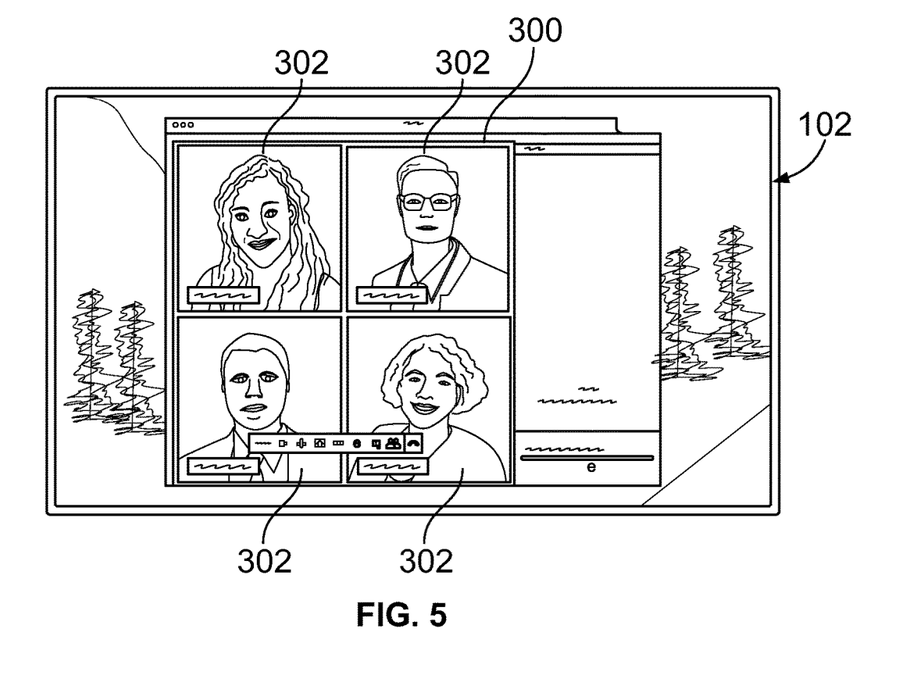
FIG. 5 illustrates a front view of the display showing a content area, according to an example of the present disclosure.

FIG. 5 illustrates a front view of the display 106 showing a content area 300, according to an example of the present disclosure. The content area 300 shows information regarding an application. As shown in FIG. 5, the application can be a video conferencing program. The content area 300 includes a plurality of prioritized content areas 302. For example, the prioritized content areas 302 can be areas that show participants in a video conference.

Figure 6:
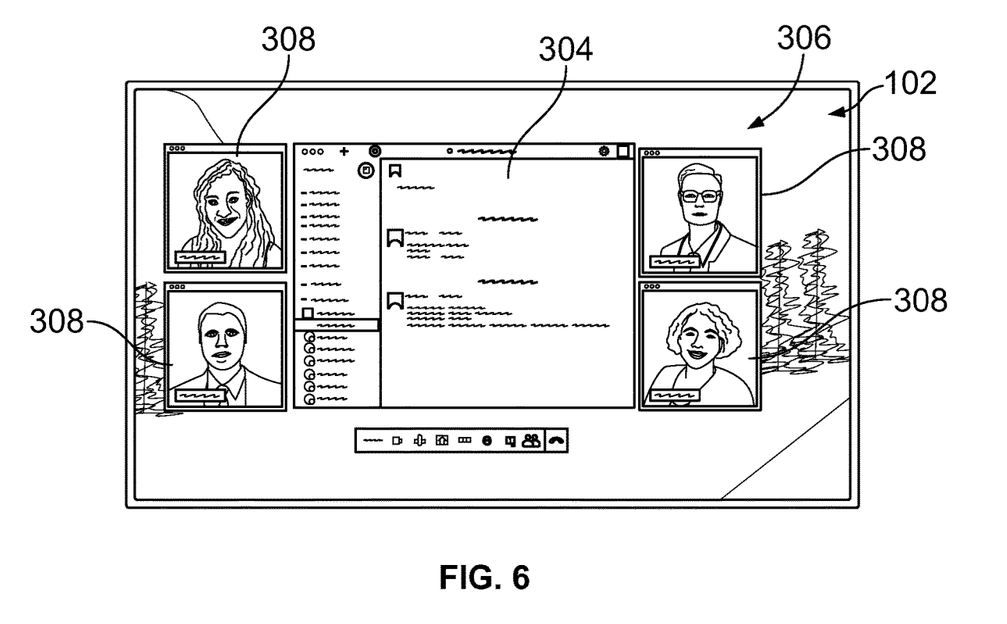
FIG. 6 illustrates a front view of the display showing an active content area and a background content area separated into components, according to an example of the present disclosure.

FIG. 6 illustrates a front view of the display 106 showing an active content area 304 and a background content area 306 separated into components 308, according to an example of the present disclosure. In this example, the active content area 304 can be related to another application, such as an email or messaging program. The background content area 306 can be the content area 300 shown in FIG. 5, but separated into the components 308, which are moved (by the control unit 108 shown in FIG. 1) to different areas of the display 106 that are not obscured by the active content area 304. For example, the components 308 can be the prioritized content areas, such as the areas that show the participants in the video conference.

Figure 7:
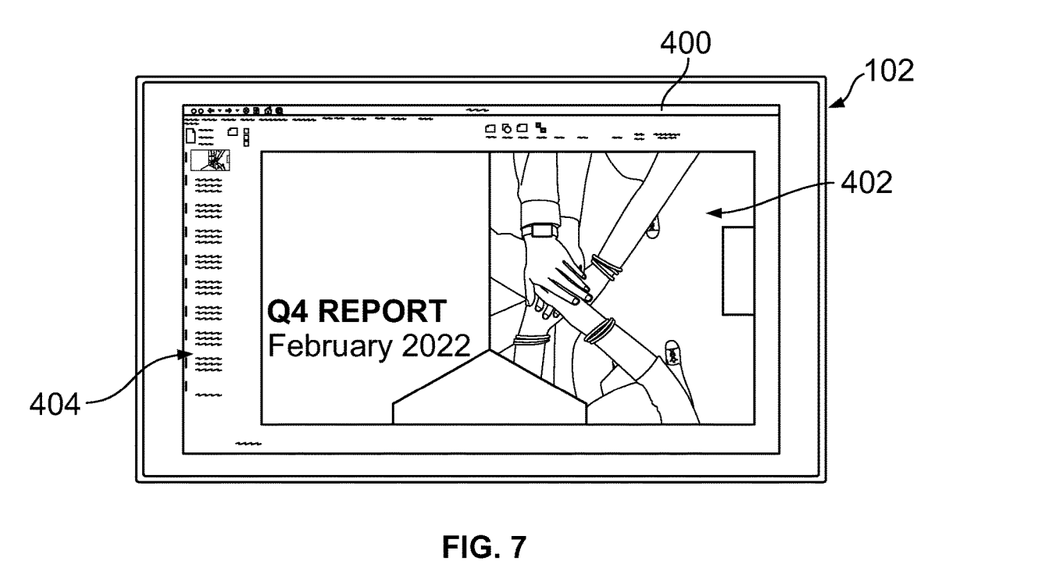
FIG. 7 illustrates a front view of the display showing a content area, according to an example of the present disclosure.

FIG. 7 illustrates a front view of the display 106 showing a content area 400, according to an example of the present disclosure. The content area 400 shows information regarding an application. As shown in FIG. 7, the application can be a slide show presentation. The content area 400 includes a prioritized content area 402, and an unprioritized content area 404. The prioritized content area 402 can be a main portion of the content area 400, such as may show a current slide of the presentation. The unprioritized content area 404 can be a side portion of the content area 400, such as may show remaining slides of the presentation in a smaller format than the current slide of the presentation.

Figure 8:
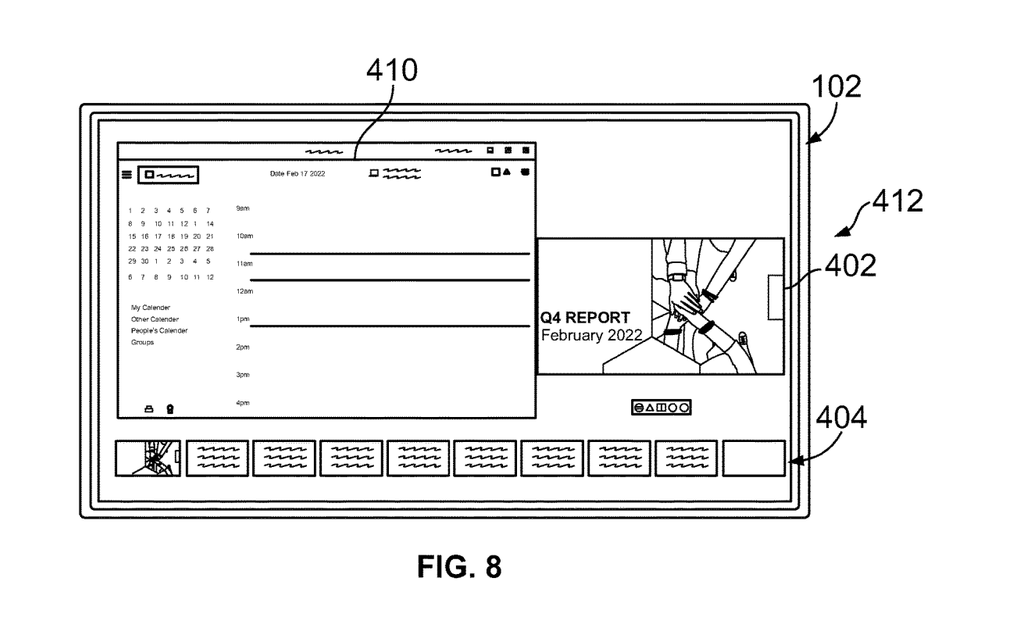
FIG. 8 illustrates a front view of the display showing an active content area and a background content area separated into components, according to an example of the present disclosure.

FIG. 8 illustrates a front view of the display 106 showing an active content area 410 and a background content area 412 separated into components 402 and 404, according to an example of the present disclosure. As shown, the active content area 410 can be an application showing a calendar. The background content area 412 is the content area 400 shown in FIG. 8, separated into the component 402 (such as the prioritized content area), and the component 404 (such as the unprioritized content area). Both the components 402 and 404 are shown unobstructed by the active content area. The components 402 and 404 are separated from one another in that they do not connect to form a single, contiguous content area.

As shown in FIG. 8, the control unit 108 (shown in FIG. 1) can separate the content area into the components 402 and 404, and show both on the display 106 such that neither is obstructed by the active content area 410. Optionally, the control unit 108 may show the component 402 such that it is not obstructed by the active content area 410, and allow the active content area 410 to obstruct at least a portion of the component 404, which can be or otherwise include unprioritized content.

Referring to FIGS. 1-8, examples of the present disclosure provide systems and methods including the control unit 108, which is configured to separate background content areas into components, such as smaller portions, and show the prioritized content on the display 106 in an intelligent way around other areas in the foreground (such as the active content area).

An application can be programmed to determine the regions of a content area that are prioritized. As another example, the control unit 108 and/or another system can analyze the content area and look for particular delineations (such as regions, colors, lines, borders, and/or the like) to automatically determine the prioritized areas. As another example, an individual user can manually identify the prioritized areas.

For example, in a video conference application, video camera feeds, a list of attendees, a chat window, and/or conference controls can be determined to be prioritized areas. As another example, in a word processing application, a pane where text is typed and displayed, and/or toolbars can be determined to be prioritized areas. As another example, in a calendar application, appointments for particular time slots can be determined to be prioritized areas. As another example, in a slide show presentation application, thumbnails of slides, a full view of a single slide, and/or slide show controls can be determined to be prioritized areas.

In at least one example, when an active content area in the foreground of the display 106 is moved or resized, the components of the background content area may be automatically repositioned (by the control unit 108) in and/or around the available space around the active content area. If the active content area is closed or moved to another monitor, for example, the control unit 108 may then reassemble the background content area to its original (unseparated) form.

Further, the disclosure comprises embodiments according to the following clauses:

Clause 1: A system comprising:
  a display configured to show a first content area and a second content area; and
  a control unit in communication with the display, wherein the control unit is configured to:
    separate the second content area into a plurality of components in response to the first content area obscuring at least a portion of the second content area, and
    show at least one of the plurality of components on a portion of the display that is outside of the first content area.

Clause 2. The system of Clause 1, wherein the first content area is an active content area in a foreground of the display, and wherein the second content area is a background content area in a background of the display.

Clause 3. The system of Clauses 1 or 2, wherein the plurality of components comprises one or more prioritized content areas and one or more unprioritized content areas.

Clause 4. The system of Clause 3, wherein the control unit is configured to show both of the one or more prioritized content areas and the one or more unprioritized content areas on the portion of the display that is outside of the first content area.

Clause 5. The system of Clause 3, wherein the control unit is configured to show only the one or more prioritized content areas on the portion of the display that is outside of the first content area.

Clause 6. The system of any of Clauses 1-5, further comprising a user interface in communication with the control unit and the display, wherein the user interface is configured to allow an individual to interact with the first content area and the second content area.

Clause 7. The system of Clause 6, further comprising a device that includes the display, the control unit, and the user interface.

Clause 8. The system of any of Clauses 1-7, wherein the first content area relates to a first application, and wherein the second content area relates to a second application.

Clause 9. The system of Clause 8, wherein each of the first application and the second application comprises one of word processing, a video game, a slide show presentation, email, internet, a calendar, an audio and/or video livestream, or an audio and/or video recording.

Clause 10. A method comprising:
  showing, on a display, a first content area and a second content area;
  separating, by a control unit in communication with the display, the second content area into a plurality of components in response to the first content area obscuring at least a portion of the second content area; and
  showing, by the control unit, at least one of the plurality of the components on a portion of the display that is outside of the first content area.

Clause 11. The method of Clause 10, wherein the first content area is an active content area in a foreground of the display, and wherein the second content area is a background content area in a background of the display.

Clause 12. The method of Clauses 10 or 11, wherein the plurality of components comprises one or more prioritized content areas and one or more unprioritized content areas.

Clause 13. The method of Clause 12, wherein said showing the at least one of the plurality of components comprises showing both of the one or more prioritized content areas and the one or more unprioritized content areas on the portion of the display that is outside of the first content area.

Clause 14. The method of Clause 12, wherein said showing the at least one of the plurality of components comprises showing only the one or more prioritized content areas on the portion of the display that is outside of the first content area.

Clause 15. The method of any of Clauses 10-14, further comprising allowing an individual, by a user interface in communication with the control unit and the display, to interact with the first content area and the second content area.

Clause 16. The method of Clause 16, wherein a device includes the display, the control unit, and the user interface.

Clause 17. The method of any of Clauses 10-16, wherein the first content area relates to a first application, and wherein the second content area relates to a second application.

Clause 18. The method of Clause 17, wherein each of the first application and the second application comprises one of word processing, a video game, a slide show presentation, email, internet, a calendar, an audio and/or video livestream, or an audio and/or video recording.

Clause 19. A non-transitory computer-readable storage medium comprising executable instructions that, in response to execution, cause one or more control units comprising a processor, to perform operations comprising:
showing a first content area and a second content area;
separating the second content area into a plurality of components in response to the first content area obscuring at least a portion of the second content area; and
showing at least one of the plurality of the components on a portion of the display that is outside of the first content area.

Clause 20. The non-transitory computer readable storage medium of Clause 19, wherein the first content area is an active content area in a foreground of a display, and wherein the second content area is a background content area in a background of the display.

As described herein, examples of the present disclosure provide systems and methods for improving presentation of content areas on a display of device. Further, examples of the present disclosure provide systems and methods for providing content areas with increased discernibility and ease of interaction on a screen of a device.

While various spatial and directional terms, such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
a display configured to show a first content area and a second content area; and
a control unit in communication with the display, wherein the control unit is configured to:
separate the second content area into a plurality of components in response to the first content area obscuring at least a portion of the second content area, wherein the plurality of components comprises one or more prioritized content areas and one or more unprioritized content areas, and
show both of the one or more prioritized content areas and the one or more unprioritized content areas on a portion of the display that is outside of the first content area.

2. The system of claim 1, further comprising a user interface in communication with the control unit and the display, wherein the user interface is configured to allow an individual to interact with the first content area and the second content area.

3. The system of claim 2, further comprising a device that includes the display, the control unit, and the user interface.

4. The system of claim 1, wherein the first content area relates to a first application, and wherein the second content area relates to a second application.

5. The system of claim 4, wherein each of the first application and the second application comprises one of word processing, a video game, a slide show presentation, email, internet, a calendar, an audio and/or video livestream, or an audio and/or video recording.

6. The system of claim 1, wherein the control unit is further configured to move the plurality of components to different areas of the display that are not obscured by the first content area.

7. The system of claim 1, wherein the first content area is an active content area in a foreground of the display, and wherein the second content area is a background content area in a background of the display.

8. A method comprising:
showing, on a display, a first content area and a second content area;
separating, by a control unit in communication with the display, the second content area into a plurality of components in response to the first content area obscuring at least a portion of the second content area, wherein the plurality of components comprises one or more prioritized content areas and one or more unprioritized content areas; and
showing, by the control unit, at least one of the plurality of the components on a portion of the display that is outside of the first content area, wherein said showing the at least one of the plurality of components comprises showing both of the one or more prioritized content areas and the one or more unprioritized content areas on the portion of the display that is outside of the first content area.

9. The method of claim 8, further comprising allowing an individual, by a user interface in communication with the control unit and the display, to interact with the first content area and the second content area.

10. The method of claim 9, wherein a device includes the display, the control unit, and the user interface.

11. The method of claim 8, wherein the first content area relates to a first application, and wherein the second content area relates to a second application.

12. The method of claim 11, wherein each of the first application and the second application comprises one of word processing, a video game, a slide show presentation, email, internet, a calendar, an audio and/or video livestream, or an audio and/or video recording.

13. The method of claim 8, further comprising moving, by the control unit, the plurality of components to different areas of the display that are not obscured by the first content area.

14. The method of claim 8, wherein the first content area is an active content area in a foreground of the display, and wherein the second content area is a background content area in a background of the display.

15. A non-transitory computer-readable storage medium comprising executable instructions that, in response to execution, cause one or more control units comprising a processor, to perform operations comprising:
showing a first content area and a second content area;
separating the second content area into a plurality of components in response to the first content area obscuring at least a portion of the second content area, wherein the plurality of components comprises one or more prioritized content areas and one or more unprioritized content areas; and
showing at least one of the plurality of the components on a portion of the display that is outside of the first content area, wherein said showing the at least one of the plurality of components comprises showing both of the one or more prioritized content areas and the one or more unprioritized content areas on the portion of the display that is outside of the first content area.

16. The non-transitory computer readable storage medium of claim 15, further comprising moving the plurality of components to different areas of the display that are not obscured by the first content area.

17. The non-transitory computer readable storage medium of claim 15, wherein the first content area is an active content area in a foreground of a display, and wherein the second content area is a background content area in a background of the display.

* * * * *